(12) United States Patent
Sone

(10) Patent No.: US 10,523,832 B2
(45) Date of Patent: Dec. 31, 2019

(54) IMAGE FORMING APPARATUS AND NON-TRANSITORY COMPUTER READABLE RECORDING MEDIUM

(71) Applicant: KYOCERA DOCUMENT SOLUTIONS INC., Osaka (JP)

(72) Inventor: Daiki Sone, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/283,417

(22) Filed: Feb. 22, 2019

(65) Prior Publication Data

US 2019/0273834 A1  Sep. 5, 2019

(30) Foreign Application Priority Data

Mar. 2, 2018  (JP) .................................. 2018-037039

(51) Int. Cl.
*H04N 1/00*  (2006.01)

(52) U.S. Cl.
CPC ..... *H04N 1/00633* (2013.01); *H04N 1/00708* (2013.01); *H04N 1/00724* (2013.01)

(58) Field of Classification Search
CPC ........... H04N 1/00708; H04N 1/00641; H04N 1/00724; H04N 1/00633
USPC ....................................................... 358/1.12
See application file for complete search history.

(56) References Cited

U.S. PATENT DOCUMENTS

| 2008/0042342 | A1 | 2/2008 | Tominaga et al. |
| 2011/0211211 | A1* | 9/2011 | Nakamura ........... B41J 13/0036 358/1.12 |
| 2018/0270376 | A1* | 9/2018 | Ikusawa ............. H04N 1/00623 |

FOREIGN PATENT DOCUMENTS

JP  2008-044281 A  2/2008

* cited by examiner

*Primary Examiner* — Saeid Ebrahimi Dehkordy
(74) *Attorney, Agent, or Firm* — Li & Cai Intellectual Property (USA) Office

(57) ABSTRACT

An image forming apparatus includes: a plurality of output trays; a storage device that stores a table, each of the plurality of output trays and a combination of a plurality of attributes of sheets-allowed-to-be-output being registered in association with each other in the table; and a controller that receives a print request, the print request including a plurality of attributes of a sheet-to-be-printed, determines whether or not a combination of the plurality of attributes included in the print request is registered in the table, if determining that the combination is not registered in the table, selects an output tray as a tray-to-catch-output-sheet with reference to the table, at least one attribute included in the print request being registered in association with the output tray selected, and if determining that none of the plurality of attributes included in the print request is registered in the table, selects no tray-to-catch-output-sheet.

5 Claims, 4 Drawing Sheets

| Tray ID | Sheet-allowed-to-be-output size | Sheet-allowed-to-be-output type |
|---|---|---|
| Tray 1 | A3, A4-R, A4, A5-R, B4, B5-R, B5, Ledger, Letter-R, Letter, Legal, Statement-R, 12×18", Folio, 8K, 16K, 16K-R | Plain paper, recycled paper … |
| Tray 2 | A3, A4-R, A4, A5-R, A6-R, B4, B5-R, B5, B6-R, 216×340 mm, SRA3, Ledger, Letter-R, Letter, Legal, Statement-R, Executive, 12×18", Oficio II, Folio, 8K, 16K-R, 16K, ISO B5, postcard, foldable postcard, 235×105 mm envelope, 162×114 mm envelope | Plain paper, cardboard … |
| Tray 3 | Width 210 to 304.8 mm × maximum length 1,220.0 mm (banner size) | Bond paper |

FIG.3

IMAGE FORMING APPARATUS AND NON-TRANSITORY COMPUTER READABLE RECORDING MEDIUM

CROSS REFERENCE TO RELATED APPLICATION

This application claims the benefit of Japanese Priority Patent Application JP 2018-037039 filed Mar. 2, 2018, the entire contents of which are incorporated herein by reference.

BACKGROUND OF THE INVENTION

1. Field of the Invention

The present disclosure relates to an image forming apparatus including a plurality of output trays. The present disclosure further relates to a non-transitory computer readable recording medium that records an image forming program executable by the image forming apparatus.

2. Description of Related Art

There is known an image forming apparatus including a plurality of output trays, which determines a tray-to-catch-output-sheet based on a plurality of attributes (sheet type, sheet size, etc.) of sheets-allowed-to-be-output of each of the plurality of output trays.

It is desirable for an image forming apparatus including a plurality of output trays to further appropriately determine a tray-to-catch-output-sheet based on a plurality of attributes of sheets-allowed-to-be-output of each of a plurality of output trays.

SUMMARY OF THE INVENTION

According to an embodiment of the present disclosure, there is provided an image forming apparatus, including:
a plurality of output trays;
a storage device that stores a table, each of the plurality of output trays and a combination of a plurality of attributes of sheets-allowed-to-be-output being registered in association with each other in the table; and
a controller that
receives a print request, the print request including a plurality of attributes of a sheet-to-be-printed,
determines whether or not a combination of the plurality of attributes included in the print request is registered in the table,
if determining that the combination is not registered in the table,
selects an output tray as a tray-to-catch-output-sheet with reference to the table, at least one attribute included in the print request being registered in association with the output tray selected, and
if determining that none of the plurality of attributes included in the print request is registered in the table, selects no tray-to-catch-output-sheet.

According to an embodiment of the present disclosure, there is provided a non-transitory computer readable recording medium that records an image forming program executable by an image forming apparatus including
a plurality of output trays,
a storage device that stores a table, each of the plurality of output trays and a combination of a plurality of attributes of sheets-allowed-to-be-output being registered in association with each other in the table, and
a controller,
the image forming program causing the controller of the image forming apparatus to:
receive a print request, the print request including a plurality of attributes of a sheet-to-be-printed;
determine whether or not a combination of the plurality of attributes included in the print request is registered in the table;
if determining that the combination is not registered in the table,
select an output tray as a tray-to-catch-output-sheet with reference to the table, at least one attribute included in the print request being registered in association with the output tray selected; and
if determining that none of the plurality of attributes included in the print request is registered in the table, select no tray-to-catch-output-sheet.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 shows an example of a structure of an output tray table; and

DETAILED DESCRIPTION OF THE PREFERRED EMBODIMENTS

Hereinafter, an embodiment of the present disclosure will be described with reference to the drawings.

1. HARDWARE CONFIGURATION OF IMAGE FORMING APPARATUS

Figure 1:
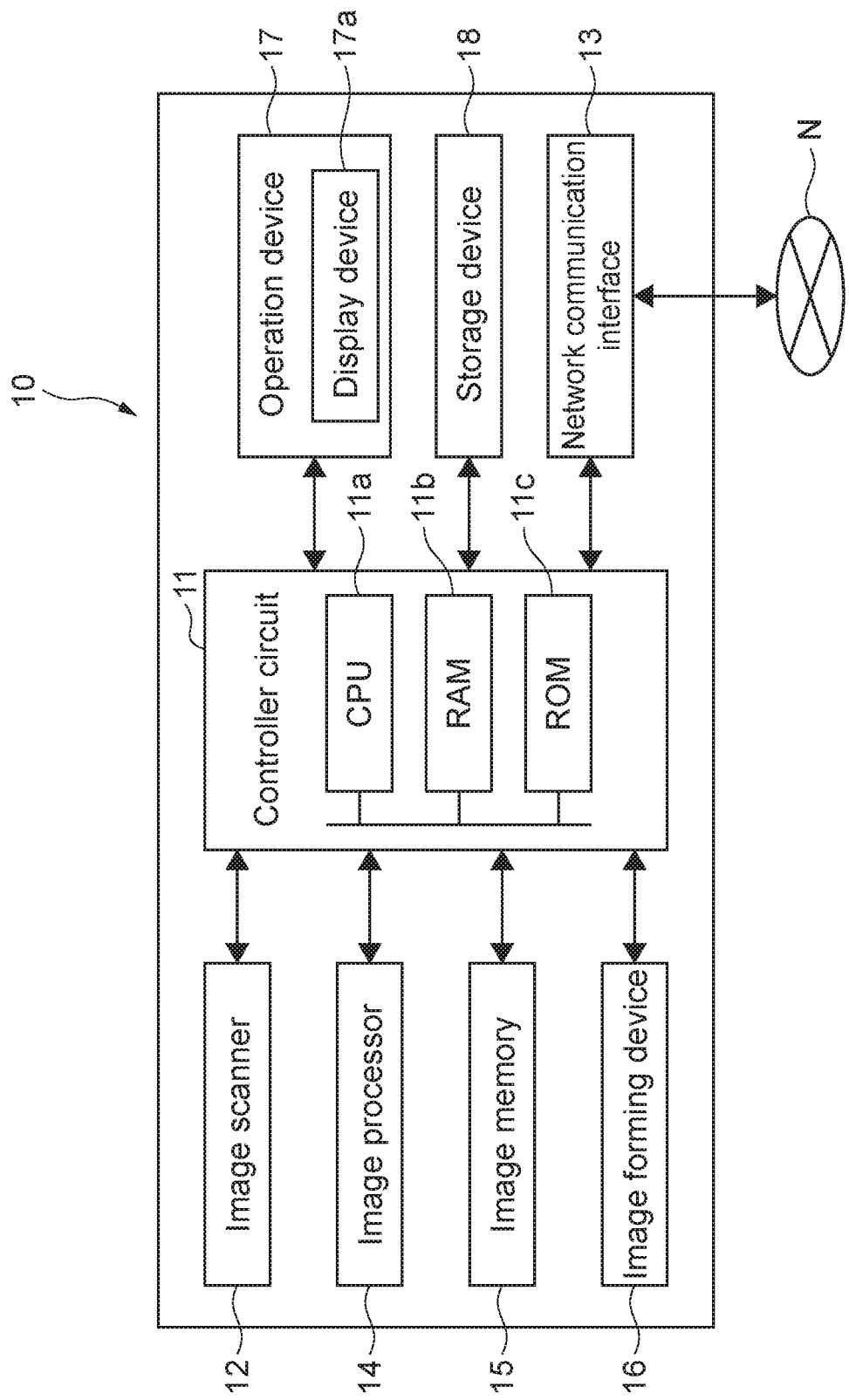
FIG. 1 shows a hardware configuration of an image forming apparatus according to an embodiment of the present disclosure.

FIG. 1 shows a hardware configuration of an image forming apparatus according to an embodiment of the present disclosure.

The image forming apparatus 10 of the present embodiment is an MFP (Multifunction Peripheral), and will be referred to as the MFP 10 hereinafter. The MFP 10 includes the controller circuit 11. The controller circuit 11 (controller) includes the CPU (Central Processing Unit) 11$a$ (processor), the RAM (Random Access Memory) 11$b$, the ROM (Read Only Memory) 11$c$ (memory), dedicated hardware circuits, and the like and performs overall operational control of the MFP 10. A computer program that causes the MFP 10 to operate as the respective functional units (to be described later) is stored in a non-transitory computer readable recording medium such as a ROM.

The controller circuit 11 is connected to the image scanner 12, the image processor 14, the image memory 15, the image forming device 16, the operation device 17, the storage device 18, the network communication interface 13, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.

The image processor 14 processes image data. Specifically, the image processor 14 rasterizes image data to thereby generate rasterized data (specifically, bitmap data). The image processor 14 converts colors of the rasterized data to thereby generate color-converted data (specifically, data of respective CMYK colors). The image processor 14 further processes the color-converted data as necessary. The image processor 14 records the respective generated data in the storage device 18.

The image memory 15 includes an area that temporarily stores data of a document image read by the image scanner 12 or data to be printed by the image forming device 16.

The image forming device 16 (printer) forms an image of image data and the like read by the image scanner 12. A sheet, on which an image is formed by the image forming device 16, is output onto any one of a plurality of output trays (which may be or may not be optionally attached) (not shown) of the MFP 10. A plurality of attributes (sheet-allowed-to-be-output size and sheet-allowed-to-be-output type, etc.) of sheets-allowed-to-be-output of the plurality of output trays are different from each other (described later in more detail). This is because hardware configurations of the output trays are different from each other, or hardware configurations of sheet delivery paths to the output trays are different from each other. As specific examples, sizes and locations of a plurality of delivery rollers provided on the sheet delivery paths to the respective output trays are different from each other, distances between rollers in delivery path directions are different from each other, distances between rollers in directions orthogonal to the delivery paths are different from each other, and the like.

The operation device 17 includes a touch panel device and an operation key device that accept user's instructions on various operations and processing executable by the MFP 1. The touch panel device includes a display device 17a such as an LCD (Liquid Crystal Display) and an organic EL (Electroluminescence) display including a touch panel. The operation device 17 is an embodiment of an input device. For example, a microphone may be provided as a device in which a user inputs an instruction.

The network communication interface 13 is an interface used for connecting to the network N.

The storage device 18 is, for example, a large-volume nonvolatile storage device such as an HDD (Hard Disk Drive) that stores a document image read by the image scanner 12, and the like. Further, the storage device 18 may be a semiconductor memory such as a RAM.

2. FUNCTIONAL CONFIGURATION OF IMAGE FORMING APPARATUS

Figure 2:
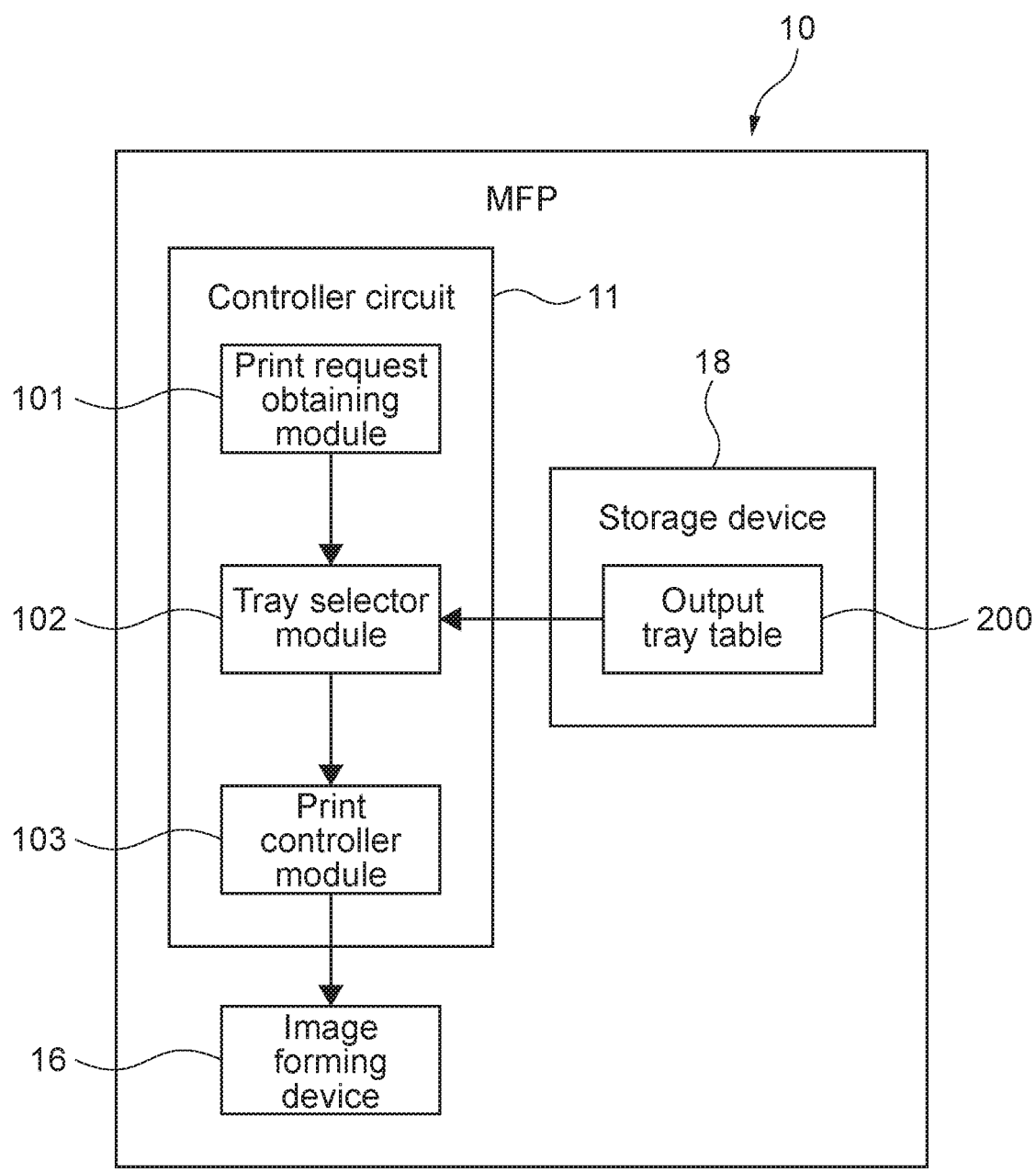
FIG. 2 shows a functional configuration of the image forming apparatus.

FIG. 2 shows a functional configuration of the image forming apparatus.

The CPU 11a of the controller circuit 11 of the MFP 10 loads an information processing program recorded in the ROM 11c in the RAM 11b to execute the information processing program to thereby operate as the print request obtaining module 101, the tray selector module 102, and the print controller module 103.

The print request obtaining module 101 receives a print request input by a user via the operation device 17 or input from an external information processing apparatus via the network communication interface 13. The print request includes a plurality of attributes of a sheet-to-be-printed. Specific examples of the "plurality of attributes of a sheet-to-be-printed" include a sheet size and a sheet type.

The tray selector module 102 selects a tray-to-catch-output-sheet based on the plurality of attributes (sheet size and sheet type) included in the print request with reference to the output tray table 200 stored in the storage device 18.

The print controller module 103 controls the image forming device 16 to form an image based on the print request obtained by the print request obtaining module 101, and to output a sheet onto the output tray selected by the tray selector module 102.

3. STRUCTURE OF OUTPUT TRAY TABLE

FIG. 3 shows an example of a structure of an output tray table.

The output tray table 200 registers each of the tray IDs 201, which identifies each of the plurality of output trays (not shown) of the MFP 10, and a combination of a plurality of attributes of sheets-allowed-to-be-output in association with each other. Specific examples of the "plurality of attributes of sheets-allowed-to-be-output" include the sheet-allowed-to-be-output size 202 and the sheet-allowed-to-be-output type 203. In other words, the output tray table 200 registers each of the trays ID 201 and a combination of the sheet-allowed-to-be-output size 202 and the sheet-allowed-to-be-output type 203 in association with each other. Specific example are as follows.

The tray ID 201 "tray 1" and the combination of the sheet-allowed-to-be-output size 202 "A3, A4-R, A4, A5-R, B4, B5-R, B5, Ledger, Letter-R, Letter, Legal, Statement-R, 12×18", Folio, 8K, 16K, 16K-R" and the sheet-allowed-to-be-output type 203 "plain paper, recycled paper . . . " are register in association with each other.

The tray ID 201 "tray 2" and the combination of the sheet-allowed-to-be-output size 202 "A3, A4-R, A4, A5-R, A6-R, B4, B5-R, B5, B6-R, 216×340 mm, SRA3, Ledger, Letter-R, Letter, Legal, Statement-R, Executive, 12×18", Oficio II, Folio, 8K, 16K-R, 16K, ISO B5, postcard, foldable postcard, 235×105 mm envelope, 162×114 mm envelope" and the sheet-allowed-to-be-output type 203 "plain paper, cardboard . . . " are register in association with each other.

The tray ID 201 "tray 3" and the combination of the sheet-allowed-to-be-output size 202 "width 210 to 304.8 mm×maximum length 1,220.0 mm (banner size)" and the sheet-allowed-to-be-output type 203 "bond paper" are register in association with each other.

4. OPERATIONAL FLOW OF IMAGE FORMING APPARATUS

Figure 4:
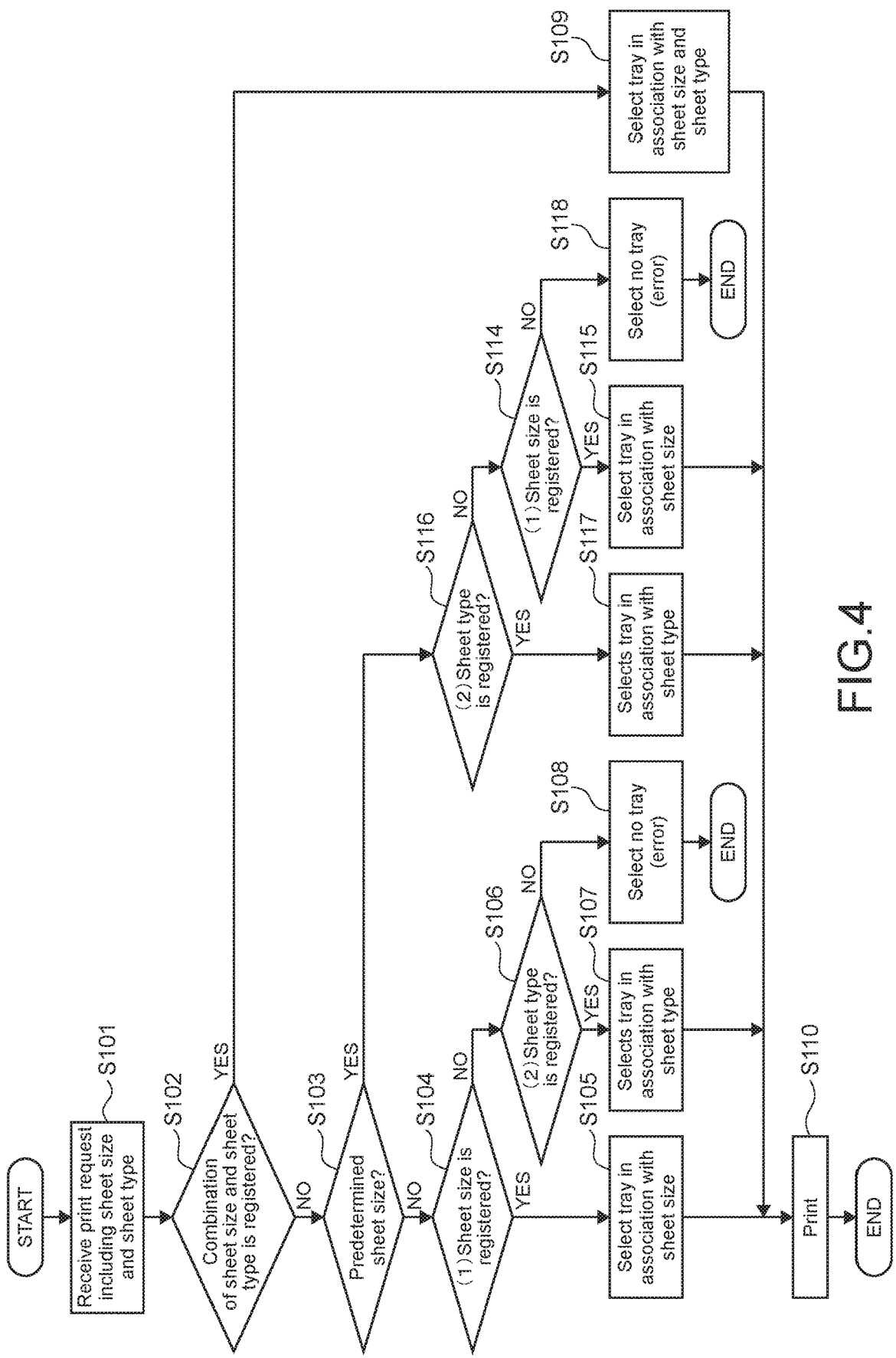
FIG. 4 shows an operational flow the image forming apparatus.

FIG. 4 shows an operational flow the image forming apparatus.

The print request obtaining module 101 receives a print request input by a user via the operation device 17 or input from an external information processing apparatus via the network communication interface 13 (Step S101). The print request includes a plurality of attributes of a sheet-to-be-printed. Specific examples of the "plurality of attributes of a sheet-to-be-printed" include a sheet size and a sheet type.

The tray selector module 102 determines whether or not the combination of the plurality of attributes (sheet size and sheet type) included in the print request is registered in the output tray table 200 (Step S102).

The tray selector module 102 determines that the combination of the plurality of attributes (sheet size and sheet type) included in the print request is registered in the output tray table 200 (Step S102, YES). It means that there is a tray that supports sheets having the plurality of attributes (sheet size and sheet type) included in the print request. Then, the tray selector module 102 selects, as a tray-to-catch-output-sheet, an output tray identified by the tray ID 201 in association with the sheet-allowed-to-be-output size 202 and the sheet-allowed-to-be-output type 203 (Step S109).

Meanwhile, the tray selector module 102 determines that the combination of the plurality of attributes (sheet size and sheet type) included in the print request is not registered in the output tray table 200 (Step S102, NO). It means that there is no appropriate tray to catch output sheets having the plurality of attributes (sheet size and sheet type) included in the print request.

Next, the tray selector module 102 determines whether or not the sheet size included in the print request is a predetermined size (Step S103). The "predetermined size" may be, for example, a size registered as the sheet-allowed-to-be-output size 202 for a plurality of tray IDs 201. The "predetermined size" may be, for example, "A3, A4-R, A4, A5-R, B4, B5-R, B5" and the like. Further, the "predetermined size" may be, for example, a sheet size in which the length in the sheet delivery direction is equal to or smaller than a first threshold, a sheet size in which the length in the sheet delivery direction is larger than a second threshold (second threshold<first threshold), or a sheet size in which the length in the sheet delivery direction is equal to or smaller than the first threshold and larger than the second threshold.

The tray selector module 102 determines that the sheet size included in the print request is not a predetermined size (Step S103, NO). Then, as the first priority, the tray selector module 102 determines (1) whether or not the sheet-allowed-to-be-output size 202 that is the same as the sheet size included in the print request is registered in the output tray table 200 (Step S104).

The tray selector module 102 determines that the sheet-allowed-to-be-output size 202 that is the same as the sheet size included in the print request is registered in the output tray table 200 (Step S104, YES). Then, the tray selector module 102 selects, as a tray-to-catch-output-sheet, an output tray identified by the tray ID 201 in association with the sheet-allowed-to-be-output size 202 (Step S105).

Meanwhile, the tray selector module 102 determines that the sheet-allowed-to-be-output size 202 that is the same as the sheet size included in the print request is not registered in the output tray table 200 (Step S104, NO). Then, as the second priority, the tray selector module 102 determines (2) whether or not the sheet-allowed-to-be-output type 203 that is the same as the sheet type included in the print request is registered in the output tray table 200 (Step S106).

The tray selector module 102 determines that the sheet-allowed-to-be-output type 203 that is the same as the sheet type included in the print request is registered in the output tray table 200 (Step S106, YES). Then, the tray selector module 102 selects, as a tray-to-catch-output-sheet, an output tray identified by the tray ID 201 in association with the sheet-allowed-to-be-output type 203 (Step S107).

Meanwhile, the tray selector module 102 determines that the sheet-allowed-to-be-output type 203 that is the same as the sheet type included in the print request is not registered in the output tray table 200 (Step S106, NO). Then, the tray selector module 102 selects no tray-to-catch-output-sheet (error) (Step S108).

Returning to Step S103, the tray selector module 102 determines that the sheet size included in the print request is a predetermined size (Step S103, YES). Then, as the first priority, the tray selector module 102 determines (2) whether or not the sheet-allowed-to-be-output type 203 that is the same as the sheet type included in the print request is registered in the output tray table 200 (Step S116 (similar to Step S106)).

The tray selector module 102 determines that the sheet-allowed-to-be-output type 203 that is the same as the sheet type included in the print request is registered in the output tray table 200 (Step S116, YES). Then, the tray selector module 102 selects, as a tray-to-catch-output-sheet, an output tray identified by the tray ID 201 in association with the sheet-allowed-to-be-output type 203 (Step S117 (similar to Step S107)).

Meanwhile, the tray selector module 102 determines that the sheet-allowed-to-be-output type 203 that is the same as the sheet type included in the print request is not registered in the output tray table 200 (Step S116, NO). Then, as the second priority, the tray selector module 102 determines (1) whether or not the sheet-allowed-to-be-output size 202 that is the same as the sheet size included in the print request is registered in the output tray table 200 (Step S114 (similar to Step S104)).

the tray selector module 102 determines that the sheet-allowed-to-be-output size 202 that is the same as the sheet size included in the print request is registered in the output tray table 200 (Step S114, YES). Then, the tray selector module 102 selects, as a tray-to-catch-output-sheet, an output tray identified by the tray ID 201 in association with the sheet-allowed-to-be-output size 202 (similar to Step S115 (Step S105)).

Meanwhile, the tray selector module 102 determines that the sheet-allowed-to-be-output size 202 that is the same as the sheet size included in the print request is not registered in the output tray table 200 (Step S114, NO). Then, the tray selector module 102 selects no tray-to-catch-output-sheet (error) (Step S118 (similar to Step S108)).

The print controller module 103 controls the image forming device 16 to form an image based on the print request (Step S101), and to output a sheet onto the selected output tray (Steps S105, S107, S109, S115, and S117) (Step S110).

5. SPECIFIC EXAMPLE

As a specific example, a print request includes, as the "plurality of attributes of a sheet-to-be-printed", "sheet size=postcard" and "sheet type=recycled paper" (Step S101).

The tray selector module 102 determines whether or not the combination of the plurality of attributes (i.e., "sheet size=postcard" and "sheet type=recycled paper") included in the print request is registered in the output tray table 200 (Step S102). In the example of FIG. 3, the combination of the sheet-allowed-to-be-output size 202 "postcard" and the sheet-allowed-to-be-output type 203 "recycled paper" is registered in association with none of the tray IDs 201 "tray 1", "tray 2", and "tray 3" (Step S102, NO). It means that It means that there is no appropriate tray to catch output sheets having "sheet size=postcard" and "sheet type=recycled paper".

Next, the tray selector module 102 determines whether or not the sheet size included in the print request is a predetermined size (for example, A3, A4-R, A4, A5-R, B4, B5-R, B5) (Step S103). The tray selector module 102 determines that the sheet size "postcard" included in the print request is not a predetermined size (Step S103, NO).

Then, the tray selector module 102 determines (1) whether or not the sheet-allowed-to-be-output size 202 that is the same as the sheet size "postcard" included in the print request is registered in the output tray table 200 (Step S104).

The tray selector module 102 determines that the sheet-allowed-to-be-output size 202 "postcard" that is the same as the sheet size "postcard" included in the print request is registered in the output tray table 200 (Step S104, YES).

Then, the tray selector module 102 selects, as a tray-to-catch-output-sheet, an output tray identified by the tray ID 201 "tray 2" in association with the sheet-allowed-to-be-output size 202 "postcard" (Step S105).

6. MODIFICATION EXAMPLES

In the present embodiment, specific examples of a plurality of attributes included in a print request include a sheet size and a sheet type, and specific examples of a plurality of attributes of a sheet-allowed-to-be-output of an output tray include a sheet-allowed-to-be-output size and a sheet-allowed-to-be-output type. The attributes may further include a sheet thickness (g/square meter), finishes (staple, punch, double-folding, triple-folding, etc.).

In the present embodiment, the MFP 10, if determining that the sheet size included in the print request is not a predetermined size (Step S103, NO), (1) determines the sheet size as the first priority (Step S104), and if determining that (1) the sheet size is not registered in the output tray table 200 (Step S104, NO), (2) determines the sheet type as the second priority (Step S106).

Instead, the MFP 10 may, if determining that the sheet type included in the print request is not a predetermined type (for example, typical sheet type such as plain paper or bond paper), (2) determine the sheet type as the first priority, and if determining that (2) the sheet type is not registered in the output tray table 200, (1) determine the sheet size as the second priority.

7. CONCLUSION

Typically, an MFP may include a plurality of optionally-attached output trays, for example. Each of the output trays has the predetermined sheet-allowed-to-be-output size and sheet-allowed-to-be-output type depending on hardware restrictions or the like. Typically, when an MFP obtains a print request, the MFP selects a tray-to-catch-output-sheet based on, as a condition, the sheet-allowed-to-be-output size and sheet-allowed-to-be-output type of each output tray depending on the attributes (sheet size and sheet type) of a sheet include in the print request.

However, depending on a model or options of an MFP, in some cases, the MFP has no output tray that satisfies the attributes (sheet size and sheet type) of a sheet included in the print request. In such a case, printing may be stopped due to an error, or a sheet may be forcefully output onto one predetermined output tray (for example, output tray having a largest variety of sheet-allowed-to-be-output sizes and a largest variety of sheet-allowed-to-be-output types). However, if printing is stopped due to an error, subsequent jobs may not be executed, and the productivity of the MFP is hindered. Meanwhile, if a sheet may be forcefully output, then it means that an unrecommended sheet is output. As a result, the sheet may be output in an abnormal manner, and paper jam may thereby occur.

In view of the aforementioned circumstances, according to the present embodiment, if determining that the combination of the plurality of attributes included in the print request is not registered in the output tray table 200 (Step S102, NO), the MFP 10 selects, as a tray-to-catch-output-sheet, an output tray, which is in association with at least one attribute included in the print request, with reference to the output tray table 200 (Steps S105, S107, S109, S115, and S117). As a result, the MFP 10 is capable of selecting an output tray, which supports the attributes included in the print request than other trays do. In other words, the MFP 10 is capable of selecting an output tray (i.e., which may less generate trouble such as paper jam) more appropriate than other trays. Further, if determining that none of the plurality of attributes included in the print request is registered in the table, the MFP 10 selects no tray-to-catch-output-sheet (error) (Steps S108 and S118). As a result, the MFP 10 is capable of reducing the number of errors (printing is stopped), and reducing the downtime of the MFP 10.

Specifically, if determining that the combination of the sheet size and sheet type included in the print request is not registered in the output tray table 200, the MFP 10 selects, as a tray-to-catch-output-sheet, an output tray based on the condition (1) or (2). (1) If determining that the sheet size included in the print request is registered in the output tray table 200, the MFP 10 selects, as a tray-to-catch-output-sheet, an output tray in association with the sheet size. (2) If determining that the sheet type included in the print request is registered in the output tray table 200, the MFP 10 selects, as a tray-to-catch-output-sheet, an output tray in association with the sheet type. As described above, the MFP 10 selects, as a tray-to-catch-output-sheet, an output tray that supports the sheet size or sheet type included in the print request. As a result, the MFP 10 is capable of selecting an output tray (i.e., which may less generate trouble such as paper jam) more appropriate than other trays.

More specifically, the MFP 10, if determining that the sheet size included in the print request is not a predetermined size (Step S103, NO), (1) determines the sheet size as the first priority (Step S104), and if determining that (1) the sheet size is not registered in the output tray table 200 (Step S104, NO), (2) determines the sheet type as the second priority (Step S106). As a result, if a sheet size is not a predetermined size (typical size), an output tray is selected based on the (1) sheet size condition with a high priority. As a result, the MFP 10 selects, as a tray-to-catch-output-sheet, an output tray that supports sheet sizes other than the predetermined size (typical size) with a high priority. As a result, the MFP 10 is capable of selecting an output tray (i.e., which may less generate trouble such as paper jam) more appropriate than other trays.

Meanwhile, the MFP 10, if determining that the sheet size included in the print request is a predetermined size (Step S103, YES), (2) determines the sheet type as the first priority (Step S116), and if determining that (2) the sheet type is not registered in the output tray table 200 (Step S116, NO), (1) determines the sheet size as the second priority (Step S114). As a result, if a sheet size is a predetermined size (typical size), an output tray is selected based on the (2) sheet type condition with a high priority. As a result, the MFP 10 selects, as a tray-to-catch-output-sheet, an output tray that supports the sheet type with a high priority. As a result, the MFP 10 is capable of selecting an output tray (i.e., which may less generate trouble such as paper jam) more appropriate than other trays.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
a plurality of output trays;
a storage device that stores a table, each of the plurality of output trays and a combination of a plurality of attributes of sheets-allowed-to-be-output being registered in association with each other in the table; and
a controller that
receives a print request, the print request including a plurality of attributes of a sheet-to-be-printed,
determines whether or not a combination of the plurality of attributes included in the print request is registered in the table,
if determining that the combination is not registered in the table,
selects an output tray as a tray-to-catch-output-sheet with reference to the table, at least one attribute included in the print request being registered in association with the output tray selected, and
if determining that none of the plurality of attributes included in the print request is registered in the table, selects no tray-to-catch-output-sheet.

2. The image forming apparatus according to claim 1, wherein
the table registers each of the plurality of output trays and a combination of a sheet-allowed-to-be-output size and a sheet-allowed-to-be-output type, as the plurality of attributes of the sheet-allowed-to-be-output, in association with each other, and
the controller
receives the print request including a sheet size and a sheet type as the plurality of attributes of the sheet-to-be-printed,
determines whether or not a combination of the sheet size and the sheet type, as a combination of the plurality of attributes included in the print request, is registered in the table,
if determining that the combination of the sheet size and the sheet type is not registered in the table,
(1) determines whether or not the sheet size included in the print request is registered in the table, and, if determining that the sheet size is registered, selects an output tray as the tray-to-catch-output-sheet, the sheet size being registered in association with the output tray selected, or
(2) determines whether or not the sheet type included in the print request is registered in the table, and, if determining that the sheet type is registered, selects an output tray as the tray-to-catch-output-sheet, the sheet type being registered in association with the output tray selected, and
if determining that the sheet size and the sheet type are not registered, selects no tray-to-catch-output-sheet.

3. The image forming apparatus according to claim 2, wherein
the controller,
if determining that the combination of the sheet size and the sheet type is not registered in the table, determines whether or not the sheet size included in the print request is a predetermined size,
if determining that the sheet size is not the predetermined size,
(1) determines whether or not the sheet size included in the print request is registered in the table, and, if determining that the sheet size is registered, selects an output tray as the tray-to-catch-output-sheet, the sheet size being registered in association with the output tray selected,
if determining that the sheet size is not registered, next,
(2) determines whether or not the sheet type included in the print request is registered in the table, and, if determining that the sheet type is registered, selects an output tray as the tray-to-catch-output-sheet, the sheet type being registered in association with the output tray selected, and
if determining that the sheet type is not registered, selects no tray-to-catch-output-sheet.

4. The image forming apparatus according to claim 3, wherein
the controller,
if determining that the sheet size is the predetermined size,
(2) determines whether or not the sheet type included in the print request is registered in the table, and, if determining that the sheet type is registered, selects an output tray as the tray-to-catch-output-sheet, the sheet type being registered in association with the output tray selected,
if determining that the sheet type is not registered, next,
(1) determines whether or not the sheet size included in the print request is registered in the table, and, if determining that the sheet size is registered, selects an output tray as the tray-to-catch-output-sheet, the sheet size being registered in association with the output tray selected, and
if determining that the sheet size is not registered, selects no tray-to-catch-output-sheet.

5. A non-transitory computer readable recording medium that records an image forming program executable by an image forming apparatus including
a plurality of output trays,
a storage device that stores a table, each of the plurality of output trays and a combination of a plurality of attributes of sheets-allowed-to-be-output being registered in association with each other in the table, and
a controller,
the image forming program causing the controller of the image forming apparatus to:
receive a print request, the print request including a plurality of attributes of a sheet-to-be-printed;
determine whether or not a combination of the plurality of attributes included in the print request is registered in the table;
if determining that the combination is not registered in the table,
select an output tray as a tray-to-catch-output-sheet with reference to the table, at least one attribute included in the print request being registered in association with the output tray selected; and
if determining that none of the plurality of attributes included in the print request is registered in the table, select no tray-to-catch-output-sheet.

* * * * *